(12) United States Patent
Cho et al.

(10) Patent No.: US 10,404,460 B2
(45) Date of Patent: Sep. 3, 2019

(54) DATA MANAGEMENT METHOD, COMPUTER READABLE RECORDING MEDIUM THEREOF, USER CLIENT FOR EXECUTING DATA MANAGEMENT METHOD, AND SECURITY POLICY SERVER

(71) Applicant: FASOO. COM CO., LTD, Seoul (KR)

(72) Inventors: Kyugon Cho, Goyang (KR); Ohseung Kwon, Yongin (KR); Junghyun Cho, Goyang (KR)

(73) Assignee: FASOO. COM CO., LTD, Seoul (KR)

( * ) Notice: Subject to any disclaimer, the term of this patent is extended or adjusted under 35 U.S.C. 154(b) by 14 days.

(21) Appl. No.: 15/505,659

(22) PCT Filed: Aug. 26, 2015

(86) PCT No.: PCT/KR2015/008936
§ 371 (c)(1),
(2) Date: Feb. 22, 2017

(87) PCT Pub. No.: WO2016/032233
PCT Pub. Date: Mar. 3, 2016

(65) Prior Publication Data
US 2017/0279609 A1    Sep. 28, 2017

(30) Foreign Application Priority Data

Aug. 27, 2014 (KR) .................. 10-2014-0112595
Oct. 29, 2014 (KR) .................. 10-2014-0148695

(51) Int. Cl.
*H04L 9/32* (2006.01)
*G06F 21/62* (2013.01)
*H04L 29/06* (2006.01)

(52) U.S. Cl.
CPC ............ *H04L 9/32* (2013.01); *G06F 21/6218* (2013.01); *H04L 63/102* (2013.01);
(Continued)

(58) Field of Classification Search
CPC ....... H04L 9/32; H04L 63/102; H04L 63/105; H04L 63/10; G06F 21/6218; G06F 2221/2139; G06F 2221/2107
See application file for complete search history.

(56) References Cited

U.S. PATENT DOCUMENTS 6,941,472 B2 *  9/2005  Moriconi .............. G06F 21/552
                                                          707/999.009
7,380,267 B2 *  5/2008  Arai ....................... G06F 21/604
                                                          726/1
(Continued)

FOREIGN PATENT DOCUMENTS

JP      08-063383      3/1996
JP      10-326243      12/1998
(Continued)

OTHER PUBLICATIONS

International Search Report for PCT/KR2015/008936 dated Feb. 22, 2016, Korean Intellectual Property Office.
(Continued)

*Primary Examiner* — Michael Pyzocha
(74) *Attorney, Agent, or Firm* — Lex IP Meister, PLLC (57) ABSTRACT

The present invention provides a data management method, a computer program for the same, a recording medium thereof, a user client for executing the method, and a security policy server. The method is executed by a user client that is network-linked to a DB server and a security policy server, the method including: 1) recognizing a user ID through a user authentication; 2) detecting whether a DB control application is executed; 3) determining whether the application is allowed to be used for the user ID; 4) determining whether the DB server is allowed to be accessed by the user ID when determining that the application is allowed to be used; 5) allowing access to the DB server when determining that the DB server is allowed to be
(Continued)

accessed; and 6) when data is transmitted from the DB server, encrypting and managing the data according to a preset user right policy.

7 Claims, 4 Drawing Sheets

(52) U.S. Cl.
CPC .... *H04L 63/105* (2013.01); *G06F 2221/2107* (2013.01); *G06F 2221/2139* (2013.01); *H04L 63/10* (2013.01)

(56) References Cited

U.S. PATENT DOCUMENTS

| | | | |
|---|---|---|---|
| 9,350,761 B1* | 5/2016 | Enderwick | G06F 21/121 |
| 2008/0163332 A1* | 7/2008 | Hanson | G06F 21/606 |
| | | | 726/1 |
| 2008/0189250 A1* | 8/2008 | Cha | G06F 21/10 |
| 2009/0106249 A1* | 4/2009 | Saito | G03G 21/04 |
| 2009/0327498 A1* | 12/2009 | Sampath | H04L 63/20 |
| | | | 709/228 |
| 2011/0072030 A1* | 3/2011 | Wong | G06F 17/30289 |
| | | | 707/759 |
| 2011/0231652 A1* | 9/2011 | Bollay | H04L 63/166 |
| | | | 713/153 |
| 2012/0101952 A1* | 4/2012 | Raleigh | G06Q 30/016 |
| | | | 705/304 |
| 2013/0055347 A1* | 2/2013 | Chawla | H04W 12/08 |
| | | | 726/3 |
| 2014/0007184 A1* | 1/2014 | Porras | G06F 21/53 |
| | | | 726/1 |
| 2014/0013396 A1* | 1/2014 | Field-Eliot | H04L 63/0807 |
| | | | 726/4 |
| 2014/0120961 A1* | 5/2014 | Buck | H04W 4/12 |
| | | | 455/466 |
| 2014/0189777 A1* | 7/2014 | Viswanathan | H04L 63/105 |
| | | | 726/1 |
| 2014/0208100 A1* | 7/2014 | Kendall | H04L 9/0863 |
| | | | 713/164 |
| 2014/0208409 A1* | 7/2014 | Maidl | G06F 21/10 |
| | | | 726/9 |
| 2017/0076351 A1* | 3/2017 | Caporusso | G06Q 30/018 |

FOREIGN PATENT DOCUMENTS

| | | |
|---|---|---|
| JP | 2006048493 | 2/2006 |
| JP | 2009193259 | 8/2009 |
| JP | 2014013582 | 1/2014 |
| KR | 10-2005-0008486 | 1/2005 |
| KR | 10-2005-0122343 | 12/2005 |
| KR | 10-2006-0109001 | 10/2006 |
| KR | 10-2008-0098337 | 11/2008 |
| KR | 10-2009-0070218 | 7/2009 |
| KR | 10-0926075 | 11/2009 |
| KR | 10-2010-0133713 | 12/2010 |
| KR | 10-2011-0029526 | 3/2011 |

OTHER PUBLICATIONS

Office Action dated Feb. 15, 2016 for Application No. 10-2014-0148695, Korean Intellectual Property Office.
JPO, Office Action of corresponding Japanese Patent Application No. 2017-510632, May 8, 2018.
SIPO, Chinese office action of CN 201580045992.2, dated Jul. 3, 2019.

* cited by examiner

DATA MANAGEMENT METHOD, COMPUTER READABLE RECORDING MEDIUM THEREOF, USER CLIENT FOR EXECUTING DATA MANAGEMENT METHOD, AND SECURITY POLICY SERVER

TECHNICAL FIELD

The present invention relates to a data management method, computer program for the same, recording medium thereof, user client for executing the data management method, and security policy server. More particularly, the present invention relates to a data management method, computer program for the same, recording medium thereof, user client for executing the data management method, and security policy server, the method executed by the user client in which a security program having a user right policy management function is installed and which is network-linked to the security policy server, thereby integratively achieving both access to data managed by the DB server and user right management of data transmitted to the user client.

BACKGROUND ART

Various security management techniques have been proposed to prevent an unauthorized user from accessing or using data managed by a DB server.

For example, there is a DB encryption method assigning a data encryption function to a DB server, providing encrypted data to a user client that requests data, and allowing the data to be used only when a decryption function is installed in the user client.

Examples of the DB encryption method include: a plug-in method where a plug-in agent is installed in a DB server to be operated with an encryption server, an API method where a DB server is operated with an encryption server in a manner of an API method, or a hybrid method thereof, etc.

For another example, there is a DB access control method enabling a user client to access a DB server through an access control server.

As the DB access control method, there are an agent method applying an agent including an access control and a logging function to a DB server itself, a gateway method setting every IP that is connected to a DB server through a DB security server (proxy server) or providing an inline security system between a DB server and a client, a sniffing method analyzing and logging packets on network tracks, etc.

However, the above-described conventional methods do not provide an integrative security technique where the DB encryption method and the DB access control method is organically combined.

In addition, after a user client having a DB server access right receives data, the above-described conventional methods do not have the control of the data. For example, it is impossible to control the situation where an unauthorized user randomly accesses data (plaintext data or decrypted data) transmitted to a user client having the access right.

DISCLOSURE

Technical Problem

The present invention has been proposed to solve the problems in the related art. The present invention is intended to propose a data management method, computer program for the same, recording medium thereof, user client for executing the data management method, and security policy server, the method executed by the user client in which a security program having a user right policy management function is installed and which is network-linked to the security policy server, thereby integratively achieving both access to data managed by the DB server and user right management of data transmitted to the user client.

Technical Solution

In order to achieve the above object, according to one aspect of the present invention, there is provided a data management method executed by a user client in which a security program having a user right policy management function is installed and which is network-linked to a DB server and a security policy server, the method including: 1) recognizing a user ID through a user authentication; 2) detecting whether a DB control application is executed; 3) determining whether the DB control application, of which the execution is detected, is allowed to be used for the user ID; 4) determining whether the DB server, to which access is attempted, is allowed to be accessed by the user ID when determining that the DB control application is allowed to be used; 5) allowing access to the DB server when determining that the DB server is allowed to be accessed; and 6) when data is transmitted from the DB server as a result of the access, encrypting and managing the transmitted data according to a preset user right policy.

Preferably, the security policy server may store and manage at least one of first security information for the DB control application that is allowed to be used for each user ID, and second security information for the DB server that is allowed to be accessed by each user ID.

Preferably, the second security information may include at least one of information of an IP address, a port address, and a used protocol of the DB server that is allowed to be accessed by each user ID.

Preferably, the user authentication of step 1) may be performed in response to a request of the user client for the user authentication from the security policy server.

Preferably, the first security information and the second security information may be transmitted from the security policy server to the user client when the user authentication of step 1) is performed.

Preferably, after the user authentication of step 1), a session connection between the user client and the DB server that is allowed to be accessed by the user ID may be performed based on the second security information.

Preferably, the data management method may further include: after the session connection is performed, 101) periodically transmitting session maintenance confirmation data by the user client to the DB server; and 102) maintaining the session connection when the DB server normally receives the session maintenance confirmation data.

Preferably, the user right policy of step 6) may be related to at least one of reading, editing, printing, capturing of a screen, decryption, and printing of a watermark for the data that is encrypted and managed by the user client.

Preferably, the user right policy may be transmitted from the security policy server to the user client when the user authentication of step 1) is performed, or may be transmitted from the security policy server when the user client requests the user right policy to set a user right for encrypting and managing the data of step 6).

According to another aspect, there is provided a data management method executed by a security policy server network-linked to a DB server and a user client in which a security program having a user right policy management function is installed, the method including: 201) storing and managing at least one of first security information for a DB control application that is allowed to be used for each user ID of the user client, and second security information for the DB server that is allowed to be accessed by each user ID; and 202) performing a user authentication in response to a request of the user client for the user authentication, wherein at least one of the first security information and the second security information is transmitted to the user client during the user authentication, and access to the DB server from the user client is managed based on at least one of the first security information and the second security information.

According to still another aspect, there is provided a computer program stored in a medium in order to execute a data management method by being combined with hardware.

According to still another aspect, there is provided a computer readable recording medium storing a computer program for executing a data management method at a computer.

According to still another aspect, there is provided a user client, in which a security program having a user right policy management function is installed and which is network-linked to both a DB server and a security policy server, the user client including: a data management unit storing data or managing use of the data transmitted from the DB server; a user authentication management unit performing a user authentication process in cooperation with the security policy server, the user authentication process having a function for recognizing a user ID through a user authentication; a user right policy management unit performing an encryption process on the data transmitted from the DB server according to a user right policy, and managing that only a user, of which a right is identified based on the user right policy, can use the data; and a DB access management unit performing an access management function for the DB server, the access management function including: a function for detecting whether a DB control application is executed; a function for determining whether the DB control application, of which the execution is detected, is allowed to be used for the user ID; a function for determining whether the DB server, to which access is attempted, is allowed to be accessed by the user ID when determining that the DB control application is allowed to be used; and a function for allowing access to the DB server when determining that the DB server is allowed to be accessed.

Preferably, the user client may further include: a session management unit performing a management function for session connection, maintenance, and termination with the DB server, the management function for the session maintenance including a function for periodically transmitting session maintenance confirmation data to the DB server after the session connection is performed.

According to yet still another aspect, there is provided a security policy server network-linked to a DB server and a user client in which a security program having a user right policy management function is installed, the security policy server including: a policy set unit setting or managing first security information for a DB control application that is allowed to be used for each user ID of the user client, second security information for the DB server that is allowed to be accessed by each user ID, and a user right policy, for both each user ID and the DB server; a user management unit managing a user registration and authentication for each user ID, the user authentication being performed in response to a request of the user client for the user authentication, wherein at least one of the first security information and the second security information is transmitted to the user client during the user authentication, and access to the DB server from the user client is managed based on at least one of the first security information and the second security information; and a server management unit managing a registration for the DB server.

Advantageous Effects

According to the above-described present invention, it is possible to integratively achieve both access management of data managed by the DB server and user right management of data transmitted to the user client, thereby enhancing data security management.

Particularly, by using a user right policy management function, it is possible to basically manage that data transmitted to a user client having a right to the use cannot be used by an unauthorized user without permission.

MODE FOR INVENTION

It should be noted that the present invention may be embodied in many different forms without departing from the spirit and significant characteristics of the present invention. Therefore, the embodiments of the present invention are disclosed only for illustrative purposes and should not be construed as limiting the present invention.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element. The term "and/or" includes any and all combinations of one or more of the associated listed items.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present invention will be described in detail with reference to the accompanying drawings. Throughout the drawings, the same reference numerals will refer to the same or like parts, and a repeated description thereof will be omitted. Further, when it is determined that the detailed description of the known art related to the present invention might obscure the gist of the present invention, the detailed description thereof will be omitted.

Figure 1:
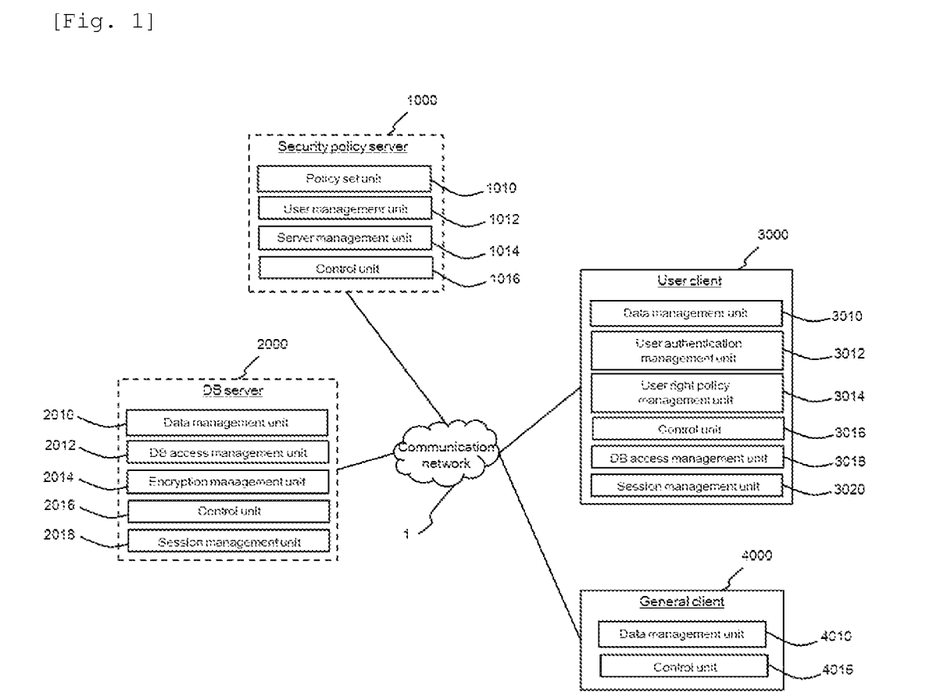
FIG. 1 is a systemic configuration view for executing a data management method according to an embodiment of the present invention.

FIG. 1 is a systemic configuration view for executing a data management method according to an embodiment of the present invention.

Provided is a user client 3000, in which a security program having a user right policy management function is installed, the user client being network-linked to a DB server 2000 and a security policy server 1000. Similar to a common DRM technique, the user right policy management function may be understood as, for example, a function of a concept similar to management where setting a user right for file or data is different depending on a user and controlling the file or data is different depending on the set right.

For example, the user right policy management function may include: encryption and decryption processes for a file, a data packet, etc. that are management targets; a user right identification process based on identification of a user ID; a process of allowing a user, of which a right is identified, to perform use actions including reading, editing, printing, capturing of a screen, decryption, printing of a watermark for an encrypted file or data packet; and a right management process of determining which range of a use action is allowed for each user among the above-described use actions.

The DB server 2000 is a server managing data, to which the user client 3000 wants to access. The DB server includes: a data management unit 2010 performing a common DBMS function, a DB access control unit 2012 performing an access control function when the user client 3000 wants access through a DB application, an encryption management unit 2014 performing an encryption function for the managed data, a control unit 2016 performing a management function across the server, and a session management unit 2018 performing a management function for session connection, maintenance, and termination with the user client 3000. The session management unit 2018 may be realized as an individual session control server being operated with the DB server 2000.

Data, which the user client 3000 wants to access, may be, for example, customer personal information data, and financial transaction information data that are managed by the DB server 2000.

The DB application may be understood as a common DB control program for performing a query (SQL) operation for the DB, etc. by a user through the user client. As examples of commercial products, there are "Toad", "Orange", "Oraclegate", "Golden SQLdeveloper", etc. For example, "Orange" is DB client software, and makes DB management and development easy through the UI.

The security policy server 1000 includes: a policy set unit 1010 setting or managing first security information, second security information, and a user right policy in cooperation with each user ID or the DB server or both; a user management unit 1012 managing a user registration, authentication for each user ID, and cooperation with each user ID; a server management unit 2014 managing a registration for the DB server and an operation with the DB server; and a control unit 1016 performing a management function across the server.

Preferably, the policy set unit 1010 sets or manages first security information of a DB control application that is allowed to be used for each user ID of the user client, second security information of the DB server that is allowed to be accessed by each user ID, and a user right policy, for both each user ID and the DB server.

Preferably, the user authentication is performed by the user management unit 1012 in response to a request of the user client for the user authentication. During the user authentication, at least one of the first security information and the second security information is transmitted to the user client. Access to the DB server from the user client is managed based on at least one of the first security information and the second security information.

The user client 3000 is a client in which a security program having a user right policy management function is installed, such that the user client is different form a general client 4000 in which the security program is not installed or is removed.

The user client 3000 includes: a data management unit 3010 storing data or managing the use of the data transmitted from the DB server; a user authentication management unit 3012 performing a user authentication process in cooperation with the security policy server 1000; a user right policy management unit 3014 performing an encryption process on the data transmitted from the DB server according to a user right policy, and managing that only a user, of which a right is identified based on the user right policy, can use the data according to a user right; a control unit 3016 performing a management function across the user client; a DB access management unit 3018 performing an access management function for the DB server 2000; and a session management unit 3020 performing a management function for session connection, maintenance, and termination with the DB server 2000.

Preferably, the user authentication process performed by the user authentication management unit 3012 includes a function for recognizing a user ID through the user authentication. The user authentication may be, for example, performed through a user login process of a single sign on (SSO) method. For example, a user inputs a user ID through the user client 3000, or an authentication server recognizes the user ID based on user input information, whereby the user ID may be recognized. The authentication server may include an individual integrative authentication server (not shown) for realizing single sign on (SSO) so as to be operated with the security policy server 1000. Alternatively, the security policy server 1000 may include a user authentication server as a sub system.

Preferably, the access management function performed by the DB access management unit 3018 includes: a function for detecting whether the DB control application is executed; a function for determining whether the DB control application, of which the execution is detected, is allowed to be used for the user ID; a function for determining whether the DB server, to which access is attempted, is allowed to be accessed by the user ID when determining that the DB control application is allowed to be used; and a function for allowing access to the DB server when determining that the DB server is allowed to be accessed.

The data management unit 3010 manages that a user, of which a right is identified, can perform data use operations related to at least one of reading, editing, printing, capturing of a screen, decryption, printing of a watermark.

The general client 4000 may be understood as a client in which a security program is not installed or is removed, and may be understood as a client of a user who does not have a right to use encrypted data according to the user right policy.

Figure 2:
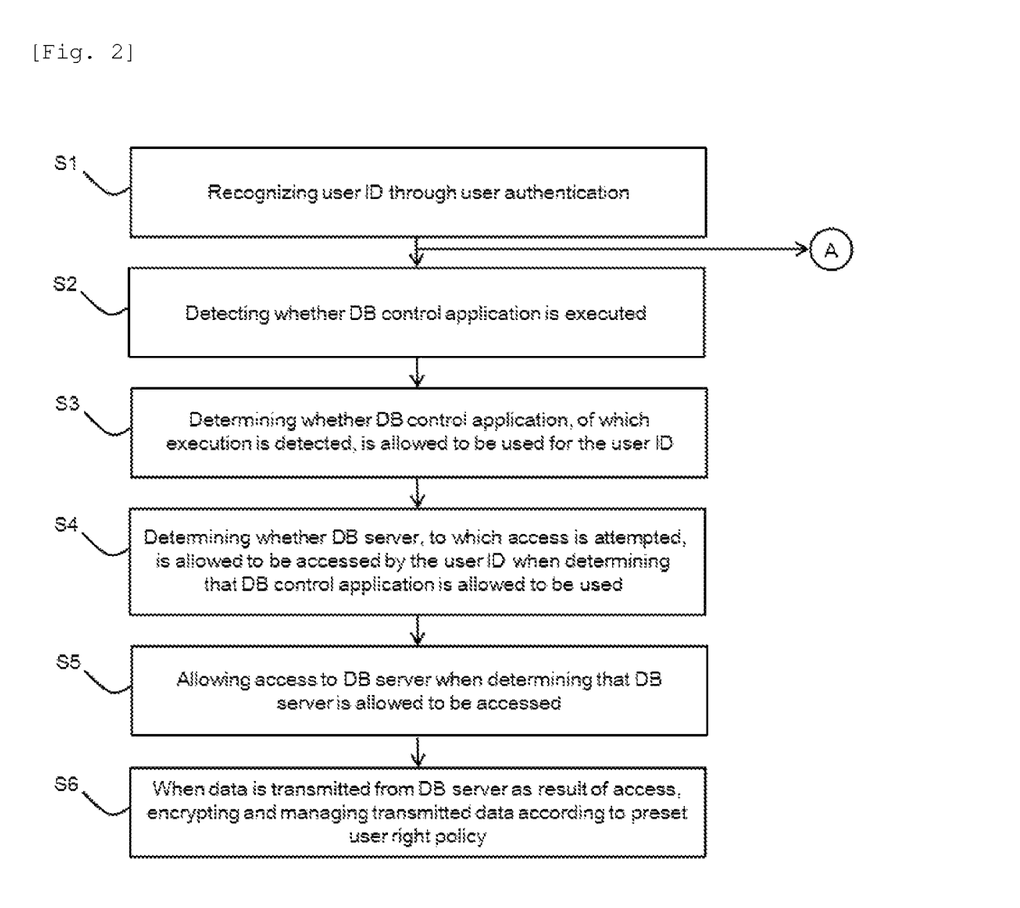
FIG. 2 is a flowchart showing a standpoint of a user client of a data management method according to an embodiment of the present invention.
Figure 3:
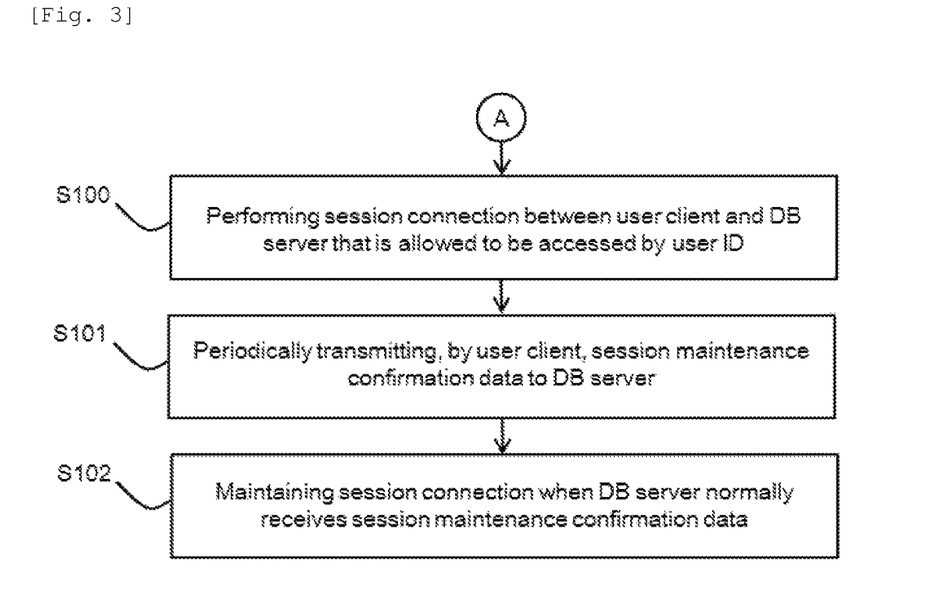
FIG. 3 is a flowchart showing a standpoint of a session management process of a data management method according to an embodiment of the present invention.

FIG. 2 is a flowchart showing a standpoint of a user client of a data management method according to an embodiment of the present invention. FIG. 3 is a flowchart showing a standpoint of a session management process of a data management method according to an embodiment of the present invention. Hereinafter, the data management method according to the embodiment will be described at a standpoint of the user client.

The data management method of the embodiment is executed by the user client in which the security program having the user right policy management function is installed and which is network-linked to the DB server and the security policy server.

Preferably, the security policy server stores and manages at least one of first security information for the DB control application that is allowed to be used for each user ID, and second security information for the DB server that is allowed to be accessed by each user ID. Particularly, the second security information includes at least one of information of an IP address, a port address, a used protocol of the DB server that is allowed to be accessed by each user ID. The first security information and the second security information may be set and managed by an administrator client (not shown) at the security policy server, and may be generated based on user registration information for setting a user ID and DB server registration information.

The user client recognizes a user ID through a user authentication at step S1. As a desirable example, the user authentication of step S1 is performed in response to a request of the user client for the user authentication from the security policy server.

Preferably, the first security information and the second security information are transmitted from the security policy server to the user client during the user authentication of step S1.

The user client detects whether the DB control application is executed at step S2. The security program having the user right policy management function is installed in the user client to detect whether the DB control application is executed. The security program may include a function file, etc. for detecting the execution of the DB control application, for example, a dynamic linking library (DLL) file, an exe file, etc.

The user client determines whether the DB control application, of which the execution is detected, is allowed to be used for the user ID at step S3.

When determining that the DB control application is allowed to be used, the user client determines whether the DB server, to which access is attempted, is allowed to be accessed by the user ID at step S4.

When determining that the DB server is allowed to be accessed, the user client allows access to the DB server at step S5. For example, access to the DB server may be understood as a condition where a user client for a user ID that is allowed to access data managed by the DB server, can request the transmission by using a query.

When data is transmitted from the DB server as a result of the access, the user client encrypts and manages the transmitted data according to a preset user right policy at step S6. The encryption and the management may be performed by well-known various data encryption processes, and detailed descriptions thereof will be omitted.

As a desirable example, the user right policy is related to at least one of reading, editing, printing, capturing of a screen, decryption, printing of a watermark for the data that is encrypted and managed by the user client.

For example, the user right policy is transmitted from the security policy server to the user client during the user authentication of step S1, or is transmitted from the security policy server when the user client requests the user right policy to set a user right for encrypting and managing the data of step S6.

In the meantime, as a desirable example, after the user authentication of step S1, a session connection between the user client and the DB server that is allowed to be accessed by the user ID is performed based on the second security information at step S100. For example, the session connection may be understood as a logical connection state between the user client and the DB server to transmit data.

After the session connection, the user client periodically transmits session maintenance confirmation data to the DB server at step S101. The transmission of the session maintenance confirmation data may be performed in response to a request of the DB server after an initial session connection, or may be performed after checking the session connection to the DB server by the user client's own action without the request of the DB server.

The user client maintains the session connection when the DB server normally receives the session maintenance confirmation data at step S102. For example, when the DB server does not receive the session maintenance confirmation data from the user client at predetermined intervals or when the DB server does not normally receive the session maintenance confirmation data, the DB server terminates the session connection to avoid the user client from accessing to the DB server. Through such processes, data transmission is avoided for the user client, in which the session connection does not normally maintained, in advance, thereby enhancing security management.

Figure 4:
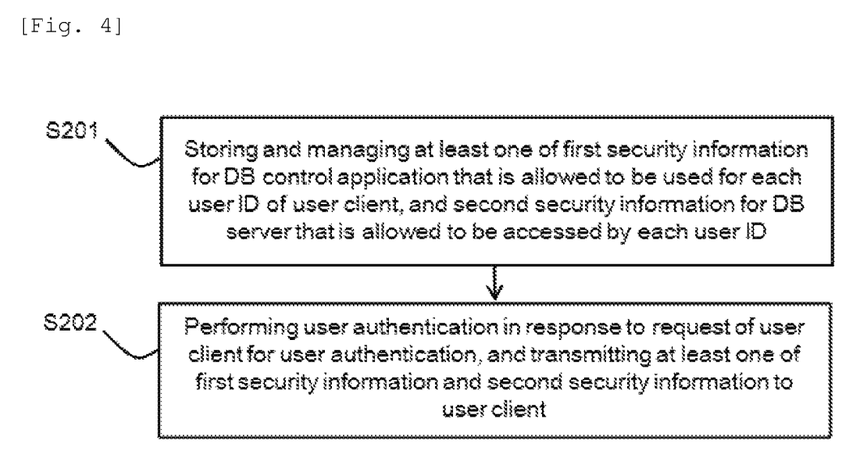
FIG. 4 is a flowchart showing a standpoint of a security policy server of a data management method according to an embodiment of the present invention.

FIG. 4 is a flowchart showing a standpoint of a security policy server of a data management method according to an embodiment of the present invention. Hereinafter, the data management method according to the embodiment will be described at a standpoint of the security policy server.

The security policy server stores and manages at least one of the first security information for the DB control application that is allowed to be used for each user ID of the user client, and the second security information for the DB server that is allowed to be accessed by each user ID at step S201.

The security policy server performs the user authentication in response to a request of the user client for the user authentication at step S202. As a desirable example, the security policy server transmits at least one of the first security information and the second security information to the user client during the user authentication, and manages access from the user client to the DB server based on at least one of the first security information and the second security information.

The embodiments of the present invention may be implemented in a form of program instructions, which are executable by various computer means, and stored in a computer-readable storage medium. The computer-readable storage medium may include stand-alone or a combination of program instructions, data files and data structures. The computer-readable medium may be specially designed and constructed for the present invention, or well-known to a person of ordinary skill in the computer software technology field. Examples of the computer-readable storage medium include magnetic recording media such as hard disks, floppy disks, and magnetic tapes; optical data storage media such as CD-ROMs, DVD-ROMs, and USB drives; magneto-optical media such as floptical disks; and hardware devices, such as read-only memory (ROM), random-access memory (RAM), and flash memory, which are particularly structured to store and implement the program instruction. The storage medium may be a transmission medium such as an optical or metallic line or a waveguide, including a carrier wave for transmitting signals designating program instructions, a data structure, etc. Examples of the program instructions include not only machine language codes made by a compiler but also high-level language codes executable by a device for electronically processing information, such as computer, by using an interpreter.

The invention claimed is:

1. A data management method executed by a user client which is network-linked to a DB server and a security policy server, wherein a security program is installed in the user client, the security program having a user right policy management function and a function for detecting whether a DB control application is executed, wherein the user right policy is related to setting a user right for at least one of reading, editing, printing, capturing of a screen, decryption, and printing of a watermark for the data that is encrypted and managed by the user client and wherein the security policy server stores and manages at least one of first security information for the DB control application that is allowed to be used for each user ID, and second security information for the DB server that is allowed to be accessed by each user ID, the method comprising:
   1) by the user client, recognizing a user ID through a user authentication, wherein the first security information and the second security information are transmitted from the security policy server to the user client when the user authentication is performed;
   2) by the user client, detecting whether a DB control application is executed;
   3) by the user client, determining whether the DB control application, of which the execution is detected, is allowed to be used for the user ID;
   4) by the user client, determining whether the DB server, to which an access attempted, is allowed to be accessed by the user ID when determining that the DB control application is allowed to be used;
   5) by the user client, allowing access to the DB server when determining that the DB server is allowed to be accessed; and
   6) by the user client, when data is transmitted from the DB server as a result of the access, encrypting and managing of the transmitted data according to a preset user right policy.

2. The data management method of claim 1, wherein the second security information includes at least one of information of an IP address, a port address, and a used protocol of the DB server that is allowed to be accessed by each user ID.

3. The data management method of claim 2, wherein the user authentication of step 1) is performed in response to a request of the user client for the user authentication from the security policy server.

4. The data management method of claim 1, wherein after the user authentication of step 1), a session connection between the user client and the DB server that is allowed to be accessed by the user ID is performed based on the second security information.

5. The data management method of claim 4, further comprising: after the session connection is performed,
   101) periodically transmitting session maintenance confirmation data by the user client to the DB server; and
   102) maintaining the session connection when the DB server normally receives the session maintenance confirmation data.

6. The data management method of claim 1, wherein the user right policy is transmitted from the security policy server to the user client when the user authentication of step 1) is performed, or is transmitted from the security policy server when the user client requests the user right policy to set a user right for encrypting and managing the data of step 6).

7. A non-transitory computer readable recording medium storing a computer program for executing a data management method at a computer, the data management method being executed by a user client which is network-linked to a DB server and a security policy server, wherein the computer program is a security program installed in the user client, the security program having a user right policy management function and a function for detecting whether a DB control application is executed, wherein the user right policy is related to setting a user right for at least one of reading, editing, printing, capturing of a screen, decryption, and printing of a watermark for the data that is encrypted and managed by the user client and wherein the security policy server stores and manages at least one of first security information for the DB control application that is allowed to be used for each user ID, and second security information for the DB server that is allowed to be accessed by each user ID, the method comprising:
   1) recognizing a user ID through a user authentication;
   2) detecting whether a DB control application is executed;
   3) determining whether the DB control application, of which the execution is detected, is allowed to be used for the user ID;
   4) determining whether the DB server, to which an access attempted, is allowed to be accessed by the user ID when determining that the DB control application is allowed to be used;
   5) allowing access to the DB server when determining that the DB server is allowed to be accessed; and
   6) when data is transmitted from the DB server as a result of the access, encrypting and managing of the transmitted data according to a preset user right policy.

* * * * *